US012626063B2

(12) United States Patent
Iwama et al.

(10) Patent No.: US 12,626,063 B2
(45) Date of Patent: May 12, 2026

(54) FORMING A HYPOTHESIS SET FROM SENTENCES ACROSS DOCUMENTS REPRESENTATIVE OF DIFFERENT STANCES TAKEN ACROSS THE DOCUMENTS

(71) Applicant: INTERNATIONAL BUSINESS MACHINES CORPORATION, Armonk, NY (US)

(72) Inventors: Futoshi Iwama, Tokyo (JP); Md Maruf Hossain, Katsushika-ku (JP); Mikio Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 18/356,660

(22) Filed: Jul. 21, 2023

(65) Prior Publication Data

US 2025/0028907 A1     Jan. 23, 2025

(51) Int. Cl.
G06F 40/289          (2020.01)
(52) U.S. Cl.
CPC .................................. G06F 40/289 (2020.01)
(58) Field of Classification Search
None
See application file for complete search history.

(56) References Cited

U.S. PATENT DOCUMENTS 7,062,508 B2 *  6/2006  Andreev ............... G06F 16/285
                                                707/999.102
8,554,701 B1 *  10/2013  Dillard .................... G06F 40/30
                                                706/12
8,626,761 B2    1/2014   Kawai et al.
10,324,969 B2   6/2019   Maitra et al.
10,832,001 B2   11/2020  Dadachev et al.
11,443,211 B2   9/2022   Ishikawa et al.
(Continued)

OTHER PUBLICATIONS

Ajour et al. "Modeling Frames in Argumentation". Proceedings of the 2019 Conference on Empirical Methods in Natural Language Processing and the 9th International Joint Conference on Natural Language Processing, pp. 2922-2932, Hong Kong, China, Nov. 3-7, 2019 (Year: 2019).*

(Continued)

*Primary Examiner* — Jesse S Pullias
(74) *Attorney, Agent, or Firm* — Konrad Raynes Davda & Victor LLP; David Victor

(57)                ABSTRACT

Provided are a computer program product, system, and method for forming a hypothesis set from sentences across documents representative of different stances taken across the documents. Sentences from the documents are clustered into a plurality of clusters. Sentences in a cluster of the clusters have stance scores with respect to other sentences in the cluster that satisfy a stance criteria. At least one similarity group of sentences is formed in the clusters having similarity scores satisfying a similarity criteria. Sentences are selected from the similarity groups in the clusters based on stance scores of the sentences in a similarity group. A hypothesis set is formed of the selected sentences in the similarity groups. Stance scores are determined of sentences in the documents with the sentences in the hypothesis set to determine stances of the documents with respect to the sentences in the hypothesis set.

17 Claims, 6 Drawing Sheets

(56)          References Cited

U.S. PATENT DOCUMENTS

| 11,544,466 B2 | 1/2023 | Kamijoh et al. | |
|---|---|---|---|
| 2005/0091038 A1 | 4/2005 | Yi et al. | |
| 2010/0023311 A1* | 1/2010 | Subrahmanian | G06F 16/345 |
| | | | 707/E17.109 |
| 2013/0232098 A1* | 9/2013 | Tateishi | G06F 40/30 |
| | | | 706/46 |
| 2015/0370887 A1* | 12/2015 | Khapra | G06F 16/9024 |
| | | | 707/739 |
| 2018/0260860 A1* | 9/2018 | Devanathan | G06F 16/353 |
| 2019/0332666 A1* | 10/2019 | Dadachev | G06F 40/284 |
| 2020/0279017 A1* | 9/2020 | Norton | G06N 3/045 |
| 2020/0285662 A1* | 9/2020 | Chatterjee | G06F 40/30 |
| 2022/0358293 A1* | 11/2022 | Renard | G06F 16/353 |

OTHER PUBLICATIONS

M. Gambini, et al., "Tweets2Stance: Users stance detection exploiting Zero-Shot Learning Algorithms on Tweets," Journal of Information Sciences, Apr. 25, 2022, 33 pp.
R. Friedman, et al., "Overview of the 2021 Key Point Analysis Shared Task," Proceedings of The 8th Workshop on Argument Mining, Nov. 10-11, 2021, pp. 154-164.
S. Li, "Topic Modeling and Latent Dirichlet Allocation (LDA) in Python," Towards Data Science, May 30, 2018, 19 pp.
R. Correa, et al., "Sentiment in Central Banks' Financial Stability Reports," International Finance Discussion Papers, Board or Governors of the Federal Reserve System, No. 1203, Mar. 2017, 52 pp.
A. Aldayel, et al., "Stance Detection on Social Media: State of the Art and Trends," arXiv:2006.03644v5, Apr. 15, 2021, 33 pp.
M. Alshomary, et al., "Key Point Analysis via Contrastive Learning and Extractive Argument Summarization," arXiv:2109.15086v2, Oct. 22, 2021, 7 pp.

* cited by examiner

Stance Cluster Information

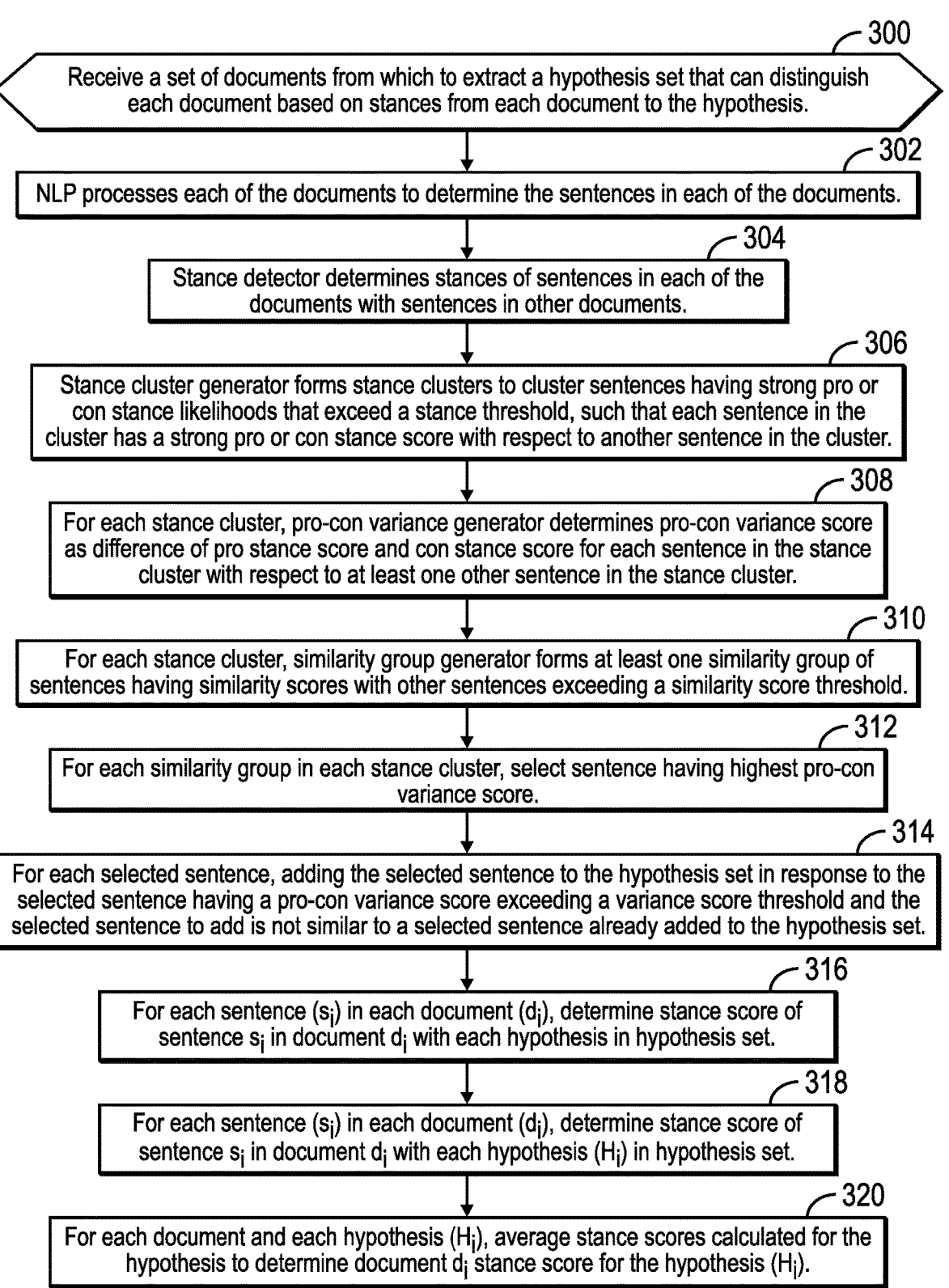

300
Receive a set of documents from which to extract a hypothesis set that can distinguish each document based on stances from each document to the hypothesis.

302
NLP processes each of the documents to determine the sentences in each of the documents.

304
Stance detector determines stances of sentences in each of the documents with sentences in other documents.

306
Stance cluster generator forms stance clusters to cluster sentences having strong pro or con stance likelihoods that exceed a stance threshold, such that each sentence in the cluster has a strong pro or con stance score with respect to another sentence in the cluster.

308
For each stance cluster, pro-con variance generator determines pro-con variance score as difference of pro stance score and con stance score for each sentence in the stance cluster with respect to at least one other sentence in the stance cluster.

310
For each stance cluster, similarity group generator forms at least one similarity group of sentences having similarity scores with other sentences exceeding a similarity score threshold.

312
For each similarity group in each stance cluster, select sentence having highest pro-con variance score.

314
For each selected sentence, adding the selected sentence to the hypothesis set in response to the selected sentence having a pro-con variance score exceeding a variance score threshold and the selected sentence to add is not similar to a selected sentence already added to the hypothesis set.

316
For each sentence ($s_i$) in each document ($d_i$), determine stance score of sentence $s_i$ in document $d_i$ with each hypothesis in hypothesis set.

318
For each sentence ($s_i$) in each document ($d_i$), determine stance score of sentence $s_i$ in document $d_i$ with each hypothesis ($H_i$) in hypothesis set.

320
For each document and each hypothesis ($H_i$), average stance scores calculated for the hypothesis to determine document $d_i$ stance score for the hypothesis ($H_i$).

FIG. 3

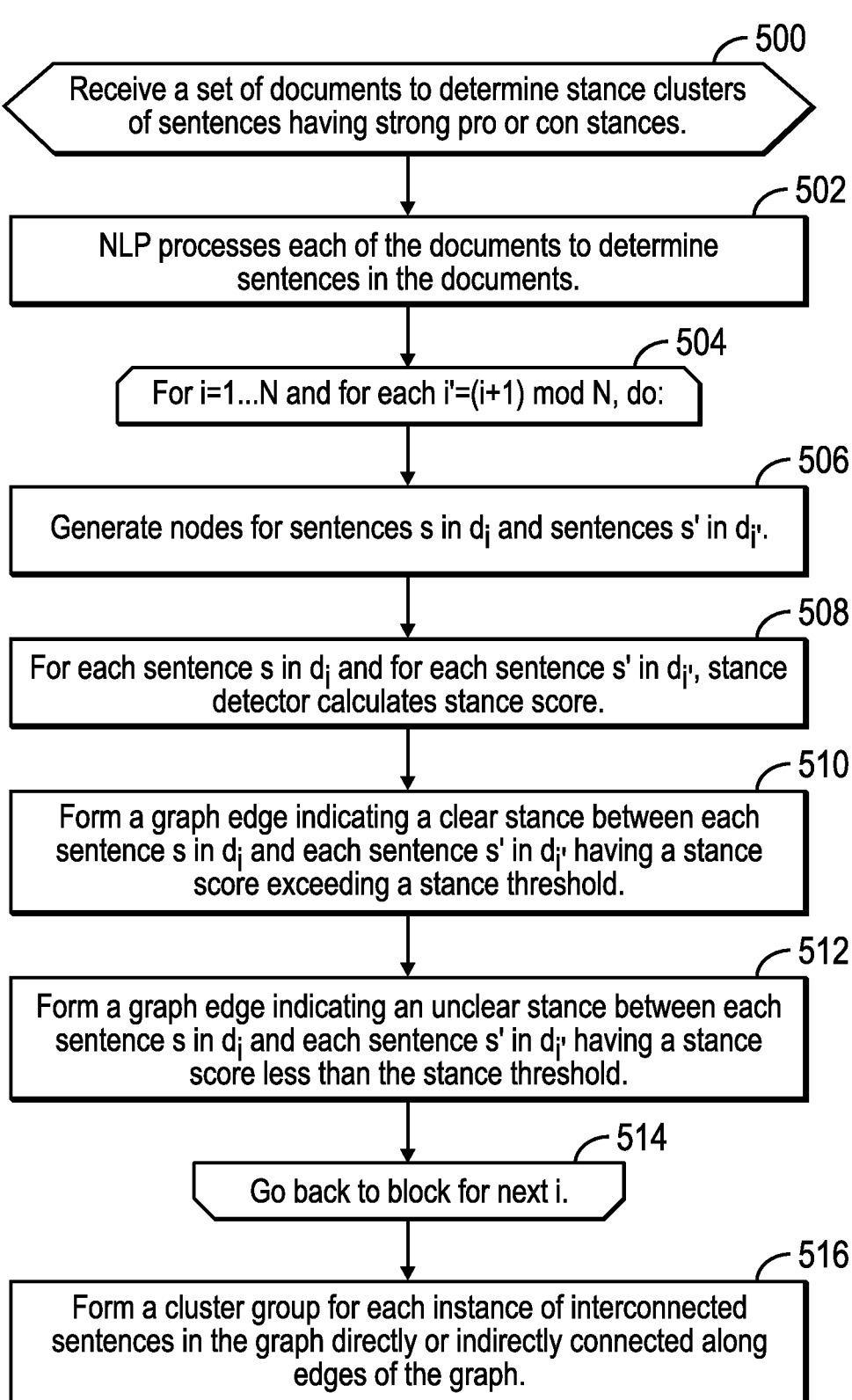

500
Receive a set of documents to determine stance clusters of sentences having strong pro or con stances.

502
NLP processes each of the documents to determine sentences in the documents.

504
For i=1...N and for each i'=(i+1) mod N, do:

506
Generate nodes for sentences s in $d_i$ and sentences s' in $d_{i'}$.

508
For each sentence s in $d_i$ and for each sentence s' in $d_{i'}$, stance detector calculates stance score.

510
Form a graph edge indicating a clear stance between each sentence s in $d_i$ and each sentence s' in $d_{i'}$ having a stance score exceeding a stance threshold.

512
Form a graph edge indicating an unclear stance between each sentence s in $d_i$ and each sentence s' in $d_{i'}$ having a stance score less than the stance threshold.

514
Go back to block for next i.

516
Form a cluster group for each instance of interconnected sentences in the graph directly or indirectly connected along edges of the graph.

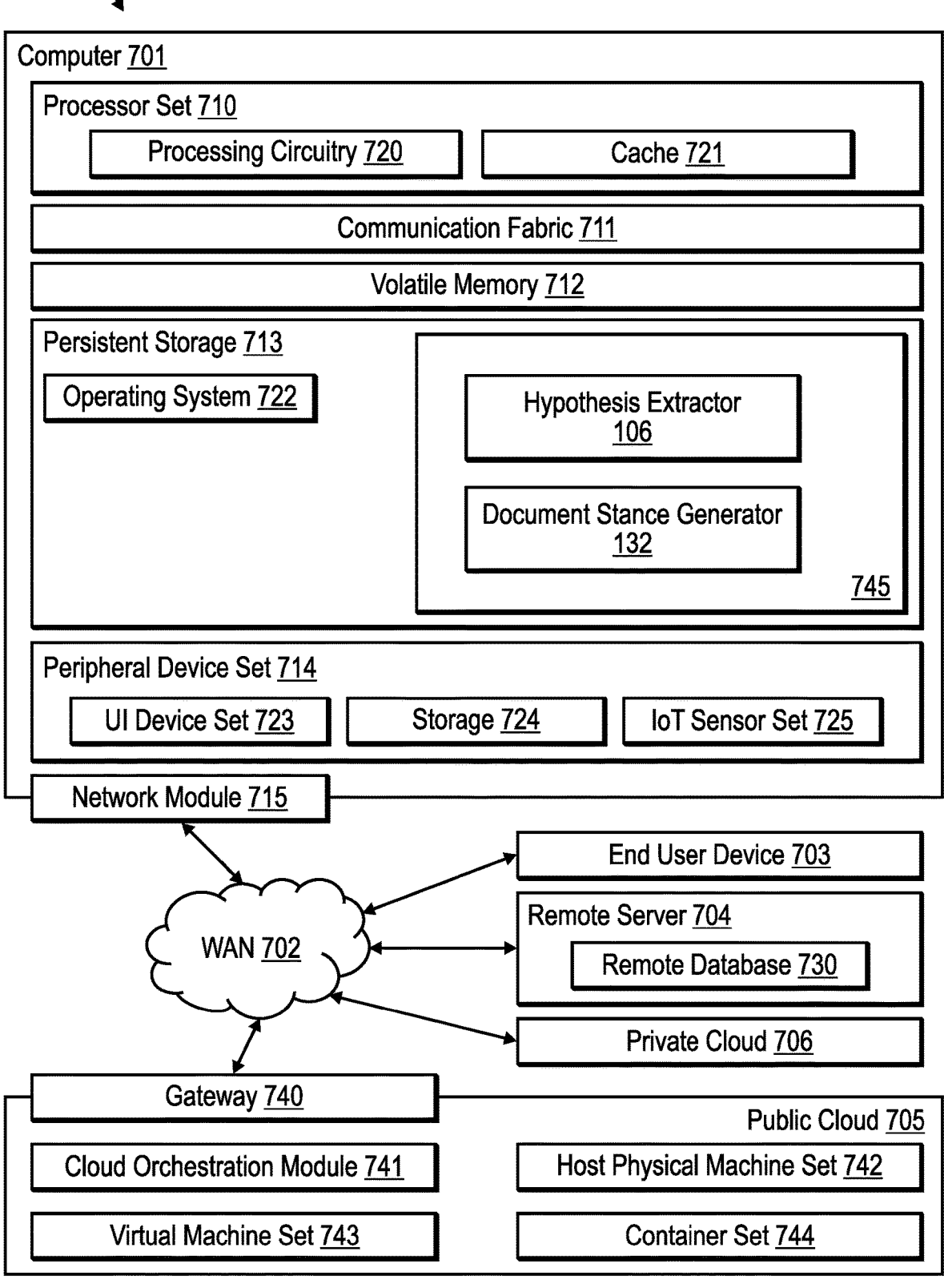

Computer 701

Processor Set 710

Processing Circuitry 720     Cache 721

Communication Fabric 711

Volatile Memory 712

Persistent Storage 713

Operating System 722

Hypothesis Extractor
106

Document Stance Generator
132

745

Peripheral Device Set 714

UI Device Set 723     Storage 724     IoT Sensor Set 725

Network Module 715

WAN 702

End User Device 703

Remote Server 704

Remote Database 730

Private Cloud 706

Gateway 740

Public Cloud 705

Cloud Orchestration Module 741     Host Physical Machine Set 742

Virtual Machine Set 743     Container Set 744

FIG. 7

FORMING A HYPOTHESIS SET FROM SENTENCES ACROSS DOCUMENTS REPRESENTATIVE OF DIFFERENT STANCES TAKEN ACROSS THE DOCUMENTS

BACKGROUND OF THE INVENTION

1. Field of the Invention

The present invention relates to a computer program product, system, and method for forming a hypothesis set from sentences across documents representative of different stances taken across the documents.

2. Description of the Related Art

Sentiment analysis is a subset of natural language processing (NLP) capabilities that provides high level filters to explore and evaluate sentiment of data. Sentiment analysis of user entered text is used to construct an enhanced perspective on the voice of the user or creator of the text. Sentiment analysis has been used to score documents and extract indicators using Sentiment Analysis. An example of the use of sentiment analysis is the central bank sentiment index (CBSI), which is derived from central bank documents.

Other techniques to determine positions and stances taken in documents include Latent Dirichlet Allocation (LDA), which is a topic modeling technique to extract abstract topics that occur in a collection of documents. Another technique to determine positions in documents is key point analysis that extracts a set of concise and high-level statements from a given collection of arguments, representing the gist of these arguments.

SUMMARY

Provided are a computer program product, system, and method for forming a hypothesis set from sentences across documents representative of different stances taken across the documents. Sentences from the documents are clustered into a plurality of clusters. Sentences in a cluster of the clusters have stance scores with respect to other sentences in the cluster that satisfy a stance criteria. At least one similarity group of sentences is formed in the clusters having similarity scores satisfying a similarity criteria. Sentences are selected from the similarity groups in the clusters based on stance scores of the sentences in a similarity group. A hypothesis set is formed of the selected sentences in the similarity groups. Stance scores are determined of sentences in the documents with the sentences in the hypothesis set to determine stances of the documents with respect to the sentences in the hypothesis set.

Further provided are a computer program product, system, and method for forming a hypothesis set from sentences across documents representative of different stances taken across the documents. For N documents $d_1 \ldots d_N$, perform for document $d_i$, for each sentence $s_j$ in $d_i$, determine a stance score between sentence $s_j$ and each sentence $s_k$ in $d_{i+1}$ di, for i=1 to N that satisfies a stance score criteria. A graph of nodes is formed representing sentences in the documents with edges between each pair of sentences having indicating stance scores exceeding the stance score criteria. Cluster groups are formed, wherein each cluster group is comprised of nodes interconnected by the edges in the graph. At least one similarity group of sentences in each cluster are formed that are similar. A hypothesis set is formed of sentences in the similarity groups to form a set of hypothesis across the documents that are as dissimilar in that they are from different similarity groups and indicate a threshold likelihood of agreement or disagreement with another sentence in the cluster.

BRIEF DESCRIPTION OF THE DRAWINGS

FIG. 3 illustrates an embodiment of operations to process a set of documents to extract a hypothesis set to distinguish the documents based on stances from the documents.

FIG. 5 illustrates an embodiment of operations to form a stance cluster of sentences in the documents that have related stances.

FIG. 7 illustrates a computing environment in which the components of FIG. 1 may be implemented.

DETAILED DESCRIPTION

Described embodiments provide improvements to computer technology to improve the capability to determine a hypothesis set of sentences providing insight into a set of documents by extracting from the document set candidate hypothesis sentences which can distinguish each document based on stances from each document to the hypotheses. Described embodiments provide techniques to determine the hypothesis set from sentences that captures the differences in stances of individual documents in the document set. Described embodiments further improve the process by automatically extracting hypothesis sentences using stance measurements.

Described embodiments determine a hypothesis set by, first, clustering the sentences that have a clear stance with each other using a stance detector to detect clear stances and then compute the variance of stance (degree of agreement or disagreement) from each sentence to other sentences in the same cluster. Similar sentences in each cluster are grouped to obtain strong stance-similar clusters that group sentences with similar content for each stance cluster. Further, sentences are selected from the similar groups within stance clusters that have the largest stance variance within that similarity group and are not similar to sentences already included in the hypothesis set.

Described embodiments extract a set of hypothesis sentences such that the stances on the hypotheses extracted from each document are as distributed as possible and that each hypothesis is not similar to each other. Described embodiments combine sentence clustering based on both stance classification and sentence similarity and sentence selection based on stance variances of sentences computed in clusters obtained by stance classification.

Figures 1, 2:
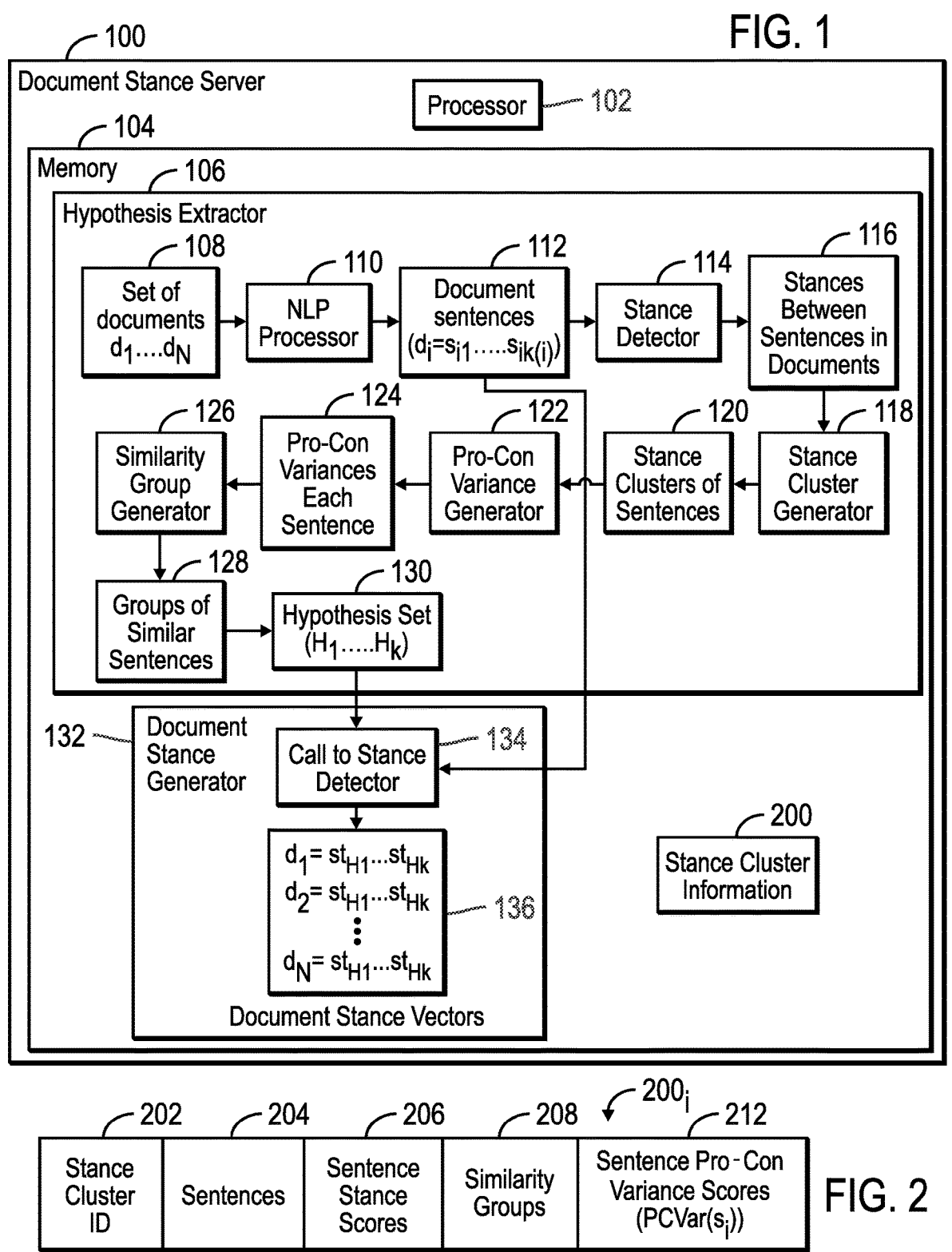
FIG. 1 illustrates an embodiment of a computing environment in which stance scores are used to form a hypothesis set of sentences in the documents to distinguish documents based on stances of sentences in the documents.
FIG. 2 illustrates an embodiment of stance cluster information.

FIG. 1 illustrates an embodiment of a document stance server 100 to determine a set of hypothesis sentences extracted from a set of documents such that the stances on the hypotheses extracted from each document are as distributed as possible and that each hypothesis is not similar to each other. The document stance server 100 includes a processor 102 and a memory 104 including a hypothesis extractor 106 to extract hypothesis sentences from a set of N documents 108, $d_1 \ldots d_N$. The documents 108 subject to the hypothesis extractor 106 may comprise hundreds or thousands of documents or more, each having thousands of sentences. The hypothesis extractor 106 includes a natural language processor (NLP) 110 that processes the set of documents 108 to determine sentences 110 $s_{i1} \ldots s_{ik}{}^i$, where there are 1 through $k^i$ sentences in document $d_i$, where $k^i$ is the last kth sentence in document $d_i$. A stance detector 114 comprises a machine learning model that determines, for a pair of sentences, whether one statement or sentence in the pair is taking a stance, such as pro (supportive), con (against) or neutral, with respect to another sentence in the pair. The stance detector 114 determines a stance between a sentence $s_i$ in one document $d_i$ and a sentence $s_j$ in another document $d_j$. The stance detector 114 determines stances between pairs of sentences 116 in the documents 108. A stance cluster generator 118 forms clusters of sentences 120 having stances of pro or con with respect to other sentences with a likelihood of a pro or con stance that exceeds a likelihood threshold. A cluster 118 has sentences such that each pair of sentences in one cluster, for which stance is detected, includes one sentence having a strong stance score with another sentence in another pair of sentences in the cluster.

A pro-con variance generator 122 determines for each sentence a pro-con variance 124 or difference between the likelihood the sentence and another sentence in the cluster has a pro stance, i.e., are in agreement, and a likelihood they have a con stance, are in disagreement. The larger a pro-con variance, the stronger is the stance, i.e., the likelihood a sentence has a pro or con stance with respect to another sentence in a pair of sentences. A similarity grouping generator 126 comprises a machine learning language model that determines whether sentences within each of the clusters 120 are similar, such as the similarity exceeds a similarity threshold, and forms groups of similar sentences 128 within the clusters 120 of sentences. In this way, sentences within a cluster, which comprises sentences having a pro or con stance with respect to each other, are clustered in groups of similar sentences 128. The hypothesis extractor 106 selects a sentence in each of the similarity groups in each of the clusters that has a highest pro-con variance value, i.e., the strongest stance, whether pro or con, to be in a final hypothesis set ($H_1 \ldots H_k$) 130 of selected sentences from the k similarity groups in the clusters.

The final hypothesis set 130 selects sentences that are not similar, i.e., in different similarity groups, of clusters of sentences with similar stances that have the highest pro-con variance, which indicates the strongest stance of the similar sentences. The resulting hypothesis set 130 sentences are such that the stances on the hypotheses extracted from each document are as distributed as possible and that each hypothesis is not similar to each other.

For instance, for sentences s and t that have a clear stance, pro or con, and are in a similar group, the sentences s and t have the same position on the same topic or an opposite position on the same topic, because they are similar sentences. If s and t take a clear stance but are not similar sentences, i.e., in a different similarity group, then s and t have a clear stance with respect to each other but are in different topics or expressions, and would not be in the same similarity group and would be eligible to both be in the hypothesis set 130. If s and t do not have a clear stance with respect to each other but are similar sentences, then they would not be in a cluster and have a neutral position on the same topic or are not related, but similar on the surface. If s and t do not take a clear stance and are not similar, then they concern different topics and take ambiguous stances with respect to each other.

After forming the hypothesis set 130, a document stance generator 132 issues a call 134 to the stance detector 114 with the hypothesis set 130 and the document sentences 112 to have the stance detector 114 determine for each document the pro or con stance of the sentences in the documents 108 with respect to the hypotheses $H_1 \ldots H_k$ in the hypothesis set 130. The resulting output of the call 134 to the stance detector 114 comprises document stance vectors 136, comprising vectors for the documents $d_i$, where each vector includes a stance ("st") with respect to each hypothesis $H_i$, where $st_{Hi}$ indicates a stance for a document $d_i$ with respect to hypothesis $H_i$. This determines each documents stance with respect to the hypotheses, which indicates a documents stance on different topics because the hypotheses sentences are from different topics, i.e., not from similar groups, and they concern different stances.

The hypothesis extractor 106 may maintain stance cluster group information 200 having information on clusters 120 and similarity groups 128 of sentences, and the pro-con variances 124 of the sentences in the documents 108.

The arrows shown in FIG. 1 between the components and objects in the document stance server 100 represent a data flow between the components.

In certain embodiments, the NLP processor 110, stance detector 114, similarity group generator 126, among others, may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the sentiment scores having specified confidence levels based on the input parameters. For instance, two sentences inputted to the stance detector 114 are processed to indicate a likelihood one sentence takes a pro, con and neutral stance with respect to the other sentence. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as the NLP processor 110, stance detector 114, and similarity group generator 126, margins of error are determined based on a difference of the calculated predictions and user rankings of the output. Biases (parameters) at nodes in the hidden layer are adjusted accordingly to minimize the margin of error of the error function.

The components 110, 114, and 126 may alternatively be implemented using an unsupervised machine learning module, or machine learning implemented in methods other than neural networks, such as multivariable linear regression models.

Generally, program modules, such as the program components 106, 110, 114, 118, 122, 126, 132, among others, may comprise routines, programs, objects, components, logic, data structures, and so on that perform particular tasks or implement particular abstract data types. The program components and hardware devices of the computing device 100 of FIG. 1 may be implemented in one or more computer systems, where if they are implemented in multiple computer systems, then the computer systems may communicate over a network.

The program components 106, 110, 114, 118, 122, 126, 132, among others, may be accessed by a processor from memory to execute. Alternatively, some or all of the program components 106, 110, 114, 118, 122, 126, 132, among others, may be implemented in separate hardware devices, such as Application Specific Integrated Circuit (ASIC) hardware devices.

The functions described as performed by the program 106, 110, 114, 118, 122, 126, 132, among others, may be implemented as program code in fewer program modules than shown or implemented as program code throughout a greater number of program modules than shown.

In further embodiments, the NLP processor 110, stance detector 114, and similarity group generator 126 may be implemented in an Artificial Intelligence (AI) Accelerator implemented on another processing unit, such as a graphical processing unit (GPU) or other hardware, having an array of processing elements (PEs).

The server 100 may comprise one or more server class computing devices, or other suitable computing devices.

FIG. 2 illustrates an embodiment of an instance of the stance cluster information 200; for one stance cluster 120 including: a stance cluster identifier (ID) 202, sentences 204 from the documents 108 in the stance cluster 202, which may identify sentence and document; sentence stance scores 206, comprising stance scores determined by the stance detector 114 between pairs of sentences $(s_i, s_j)$ in the stance cluster 202; similarity groups 208 determined by the similarity group generator 126 of sentences in the cluster 202 that are similar; and sentence pro-con variance scores 212 $(PCVar(s_i))$, generated by the pro-con variance generator 122, indicating a difference of the pro and con stance likelihoods between a pair of sentences $(s_i, s_t)$ in the stance cluster 202. A sentence in a stance cluster may have multiple PCVar scores with respect to other sentences in a stance cluster 202.

FIG. 3 illustrates an embodiment of operations performed by the hypothesis extractor 106 and the document stance generator 132 to determine a hypothesis set 130 to use to determine the stances of the documents with respect to the hypothesis set of sentences extracted from the documents. Upon receiving (at block 300) a set of documents 108, the NLP processor 110 processes (at block 302) each of the documents $d_1 \ldots d_N$ to determine the sentences 112 in each of the documents. The stance detector 114 determines (at block 304) stances of sentences in each of the documents with sentences in other documents. In one embodiment, the stance detector 114 may determine stances between each pair of sentences in the same and different documents. FIG. 5 provides an alternative technique for selecting sentences between documents for which stances are determined. After determining stances, a stance cluster generator 118 forms (at block 306) stance clusters 120 to cluster sentences having strong pro or con stance likelihoods that satisfy a stance criteria, such as exceed a stance threshold, such as a high likelihood, e.g., 80%, of a pro or con stance between two sentences. A cluster may be formed such that each sentence in the cluster has a strong pro or con stance score with another sentence in the cluster. A graph may be formed having nodes representing sentences and edges between nodes, where each edge represent nodes having strong pro or con stance scores, such that sentences are in the same cluster that have strong stances with other sentences in the cluster. In this way, multiple sentences in the same cluster are interconnected by multiple edges representing strong pro and con stances between sentence nodes in the graph. A cluster clusters sentences having strong pro or con stances with respect to each other.

The pro-con variance generator 122 determines (at block 308), for each stance cluster, pro-con variance scores 124 as a difference of a pro stance score, e.g., likelihood of a pro stance or agreement between the sentences $s_i$ and $s_j$ in the cluster, and a con stance score, e.g., likelihood of a con stance or disagreement between the sentences $s_i$ and $s_j$ in the same cluster. In one embodiment, within a cluster, a pro-con variance score may be determined for each sentence in the cluster with respect to every other sentence in the cluster, so that one sentence in a k size cluster has k−1 pro-con variance scores with respect to other sentences in the cluster. The similarity group generator 126 forms (at block 310), for each of the stance clusters 120, at least one similarity group 128 of sentences having similarity scores with other sentences satisfying a similarity criteria, such as exceeding a similarity score threshold. The hypothesis extractor 106 selects (at block 312), for each similarity group in each stance cluster, a sentence having the highest pro-con variance score, such that the strongest stance representative sentence of each similarity group in the stance clusters is selected. For each selected sentence, the hypothesis extractor 106 adds (at block 314) the selected sentence to the hypothesis set 130 in response to the selected sentence having a pro-con variance score exceeding a variance score threshold ant the selected sentence to add is not similar to a selected sentence already added to the hypothesis set 130.

The document stance generator 132 determines (at block 316), for each sentence $(s_i)$ in each document $(d_i)$, a stance score of the sentence $s_i$ in document $d_i$ with respect to each hypothesis $H_1 \ldots H_N$ in the hypothesis set 130. The document stance generator 132 then aggregates stance scores of sentences in a document with respect to each hypothesis $H_i$. In one embodiment, the document stance generator 132 may calculate, for each document $d_i$ and each hypothesis (Hi), average stance scores (or other statistics) calculated for the hypothesis $H_i$ to determine document $d_i$ stance score for the hypothesis (Hi). The result of these operations are document stance vectors 136 having, for a document, aggregate document stance scores for each hypothesis in the hypothesis set 130.

With the embodiment of FIG. 3, sentences in the documents are clustered that have clear stances, as determined by the stance detector 114 and a pro and con stance score variances measured for each sentence in the cluster. Sentences are further clustered by similarity. This process generates clusters that have clear stances to many documents and have different topics, i.e., sentences from different similarity groups. With described embodiments, hypotheses are selected from those that have a high pro-con variance and that are not similar to those already included in the hypothesis set 130, so the hypothesis set does not include similar hypotheses.

Figure 4:
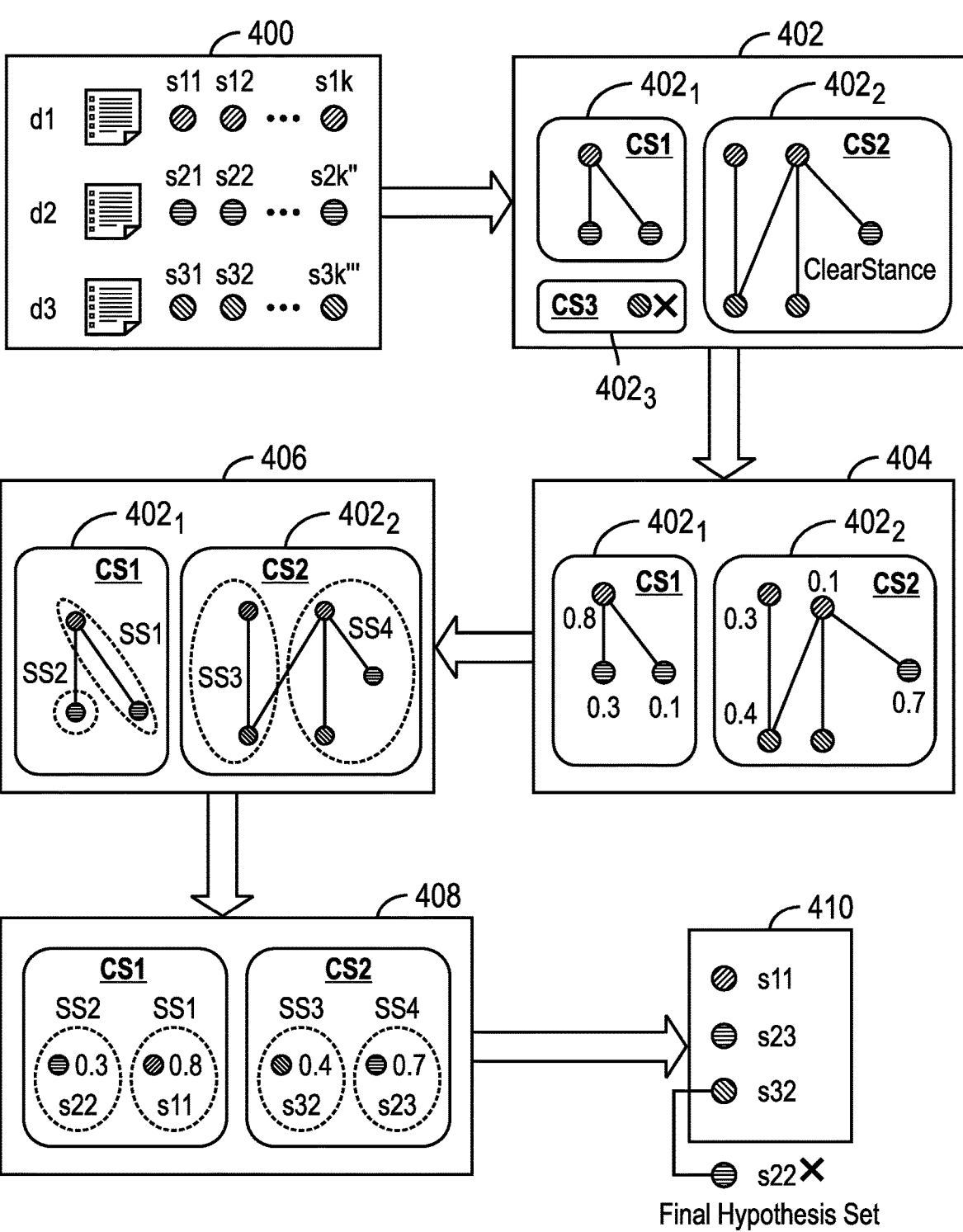
FIG. 4 illustrates an example of performing the operations of FIG. 3 on documents.

FIG. 4 provides an example of how sentences in different documents 400 are processed to generate the hypothesis set 410 according to FIG. 3. The documents d1, d2, d3 are parsed into their respective sentences, where sentence $s_{i,j}$ comprises the jth sentence in document $d_i$. The stance cluster generator 118 forms stance groups 402, comprised of three stance groups CS1 402$_1$, CS2 402$_2$, CS3 402$_3$, where CS refers to clear stance, meaning the sentences in a cluster have a clear pro or con stance with respect to each other that exceeds a stance threshold. A line between two sentence nodes represents a pro or con stance score between two sentences exceeding a stance score threshold. The stance group CS3 402$_3$ is not subject to further processing because its stance score is below a stance score threshold. The pro-con variance generator 122 determines pro-con stance variances between nodes in each stance cluster 402$_1$, 402$_2$, as shown in box 404, where the calculated pro-con stance variances for sentences comprise the numbers shown next to sentence nodes in the stance clusters 402$_1$, 402$_2$ The similarity group generator 126 then forms similarity groups SS1, SS2, SS3, SS4 sentences in the stance clusters CS1 402$_1$, CS2 402$_2$, as shown in box 406. The hypothesis extractor 106 then selects sentences having the highest pro-con variances in each similarity groups SS1, SS2, SS3, SS4, as shown in box 408. These selected sentences S11, S23, and S32 are then in the final hypothesis set 410, with sentence s22 excluded due to a pro-con variance score less than a pro-con variance threshold. Further, selected sentences from the similarity group that are similar to sentences already added to the hypothesis set 130 are also not included, so the hypothesis set 130 retains dissimilar sentences.

FIG. 5 illustrates an embodiment of operations performed by the hypothesis extractor 106 to form stance clusters of sentences having pro or con stances with respect to each other. Upon receiving (at block 500) a set of N documents 108, the NLP processor 110 determines (at block 502) sentences in each of the documents. A loop of operations is performed at blocks 504 through 514 for i=1 . . . . N and for each i'=(i+1) mod N, where N is the number of documents. Thus, at i=N, i'=(N+1) mod N. At block 506, the hypothesis extractor 106 generates nodes for sentences s in document d$_i$ and for sentences s' in document d$_{i'}$. The stance detector 114 calculates (at block 508) the stance score for each sentence s in d$_i$ and for each sentence s' in d$_{i'}$. A graph edge is formed (at block 510) indicating a clear stance between each sentence s in d$_i$ and each sentence s' in d$_{i'}$, having a pro or con stance score satisfying a stance criteria, such as exceeding a stance threshold, indicating a high likelihood of a pro or con stance, e.g., higher than 80% likelihood. A graph edge is formed (at block 512) indicating an unclear stance between each sentence s in d$_i$ and each sentence s' in d$_{i'}$, having a stance score less than the stance threshold, indicating a low likelihood of a clear pro or con stance between sentences, i.e., the sentences do not clearly agree or disagree with one another. After forming a graph of edges between sentences in documents, the stance cluster generator 118 forms (at block 516) a cluster group 200$_i$ for each instance of interconnected sentences in the graph directly or indirectly connected along edges of the graph.

Figure 6:
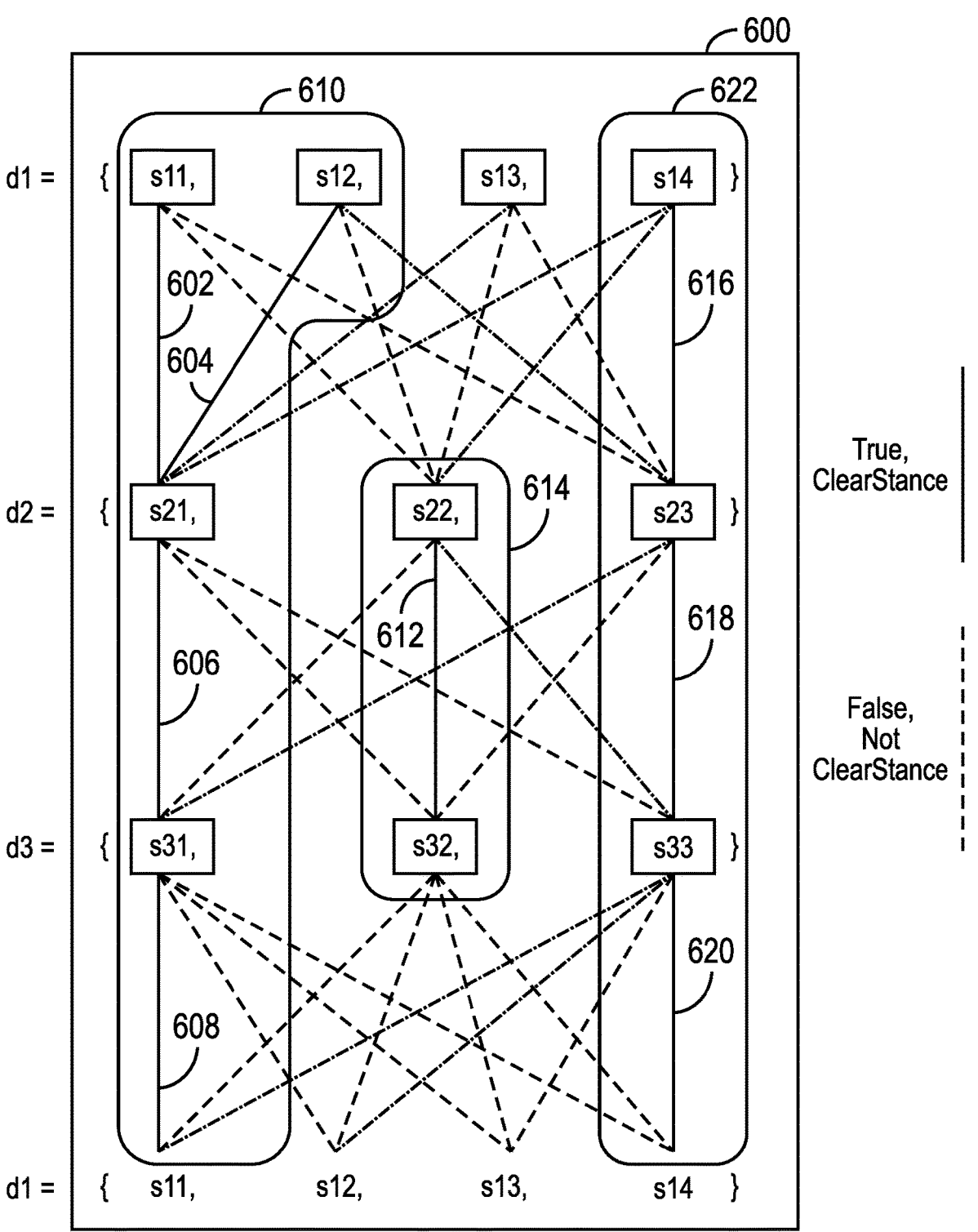
FIG. 6 an example of performing the operations of FIG. 5 on documents.

FIG. 6 illustrates how a graph 600 is formed according to FIG. 5. In FIG. 6, there are three documents d1, d2, d3. Sentences S11 and S12 in document d1 have a strong, e.g., exceeding a stance score threshold, pro or con stance with sentence S21 in document 2, sentence S21 has a strong pro or con stance with sentence s31 in document 3, and for the i'=(3+1) MOD 3 instance, sentence s31 has a strong pro or con stance with sentence s11 in document d1. All the edges 602, 604, 606, 608, representing stance scores exceeding a threshold, between sentences s11, s12, s21, s31, form a stance cluster 610. The dashed lines represent an unclear stance, i.e., false, not clear stance, meaning no clear pro or con stance exceeding a stance threshold between sentences in the document. Sentences having low stance values, indicating less likelihood two sentence have a clear pro or con stance with respect to each other, are ignored when forming the stance clusters. The edge 612 between sentence s22 in document d2 and s32 in document 3 represents a strong pro or con stance between sentences s22 and s32 that form stance cluster 614. Further the edges 616, 618, and 620 represent clear or strong stances between sentences s14, s23, and s33 in documents d1, d2, d3, which form stance cluster 622.

With the embodiments of FIGS. 5 and 6, a graph is formed of nodes representing the sentences with edges representing calculated stance scores between sentences. Interrelated sentences connected, directly and indirectly, via edges representing stance scores exceeding a threshold form a stance cluster of sentences taking strong pro or con stances with respect to each other.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With respect to FIG. 7, computing environment 700 contains an example of an environment for the execution of at least some of the computer code involved in performing the inventive methods, including, in block 745, a hypothesis extractor 106 to extract hypotheses from a set of documents and a document stance generator 132 to determine stances of the documents with respect to the extracted hypothesis, as described with respect to FIG. 1. In addition to block 745, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 745, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods of block 745 may be stored in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The letter designators, such as i, j, k, N, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for extracting hypotheses from documents for a stance measurement, the computer program product comprising a computer readable storage medium having computer readable program code embodied therein that is executable to perform operations, the operations comprising:
   determining, with a stance detector, machine stance scores of sentences;
   clustering the sentences from the documents into a plurality of clusters, wherein the sentences in a cluster of the clusters have stance scores with respect to other sentences in the cluster that satisfy a stance criteria;
   forming, with a similarity group generator, at least one similarity group of the sentences in each of a plurality of the clusters, wherein each similarity group in one of the clusters has the sentences in one of the clusters having similarity scores satisfying a similarity criteria, wherein a plurality of similarity groups are formed from the sentences in one of the clusters, and wherein the stance detector and the similarity group generator are implemented using machine learning algorithms;
   selecting sentences from similarity groups in the clusters based on stance scores of the sentences in the similarity groups;
   forming a hypothesis set of the selected sentences in the similarity groups; and
   determining the stance scores of sentences in the documents with the sentences in the hypothesis set to determine stances of the documents with respect to the sentences in the hypothesis set.

2. The computer program product of claim 1, wherein the forming the hypothesis set further comprises:
   for a candidate selected sentence of the selected sentences, adding the candidate selected sentence to the hypothesis set in response to the candidate selected sentence having a pro-con variance score greater than a pro-con variance score threshold and the candidate selected sentence is not similar to a selected sentence already included in the hypothesis set.

3. The computer program product of claim 1, wherein the stance criteria comprises a stance score threshold, such that a stance score exceeding the stance score threshold indicates one sentence in a cluster has a clear pro or con stance with respect to another sentence in the cluster, and wherein the similarity criteria comprises a similarity score threshold, such that a similarity score exceeding the similarity score threshold indicates sentences that are similar.

4. The computer program product of claim 1, wherein the operations further comprise:
   determining, for the clusters, a pro-con variance score with respect to each sentence $s_i$ in a cluster and at least one other sentence $s_j$ in the cluster as a difference of a pro stance score between $s_i$ and $s_j$ and a con stance between $s_i$ and $s_j$, wherein the forming the hypothesis set comprises only including sentences having a pro-con variance score exceeding a pro-con variance score threshold.

5. The computer program product of claim 1, wherein each pair of sentences in one cluster having a stance score satisfying the stance criteria includes one sentence having a strong stance score with respect to another sentence in the cluster.

6. The computer program product of claim 1, wherein the determining the stance scores of sentences in the documents with the sentences in the hypothesis set comprises:
   for each document of the documents, determining an aggregate statistic of stance scores of each sentence in the document with respect to each sentence in the hypothesis set, wherein the aggregate statistic of the stance scores with respect to one sentence in the hypothesis set comprises a document stance score for the document with respect to the sentence in the hypothesis set.

7. A system for extracting hypotheses from documents for a stance measurement, comprising:
   a processor; and
   a computer readable storage medium having computer readable program code embodied therein that is executable to perform operations, the operations comprising:
      determining, with a stance detector, stance scores of sentences;
      clustering the sentences from the documents into a plurality of clusters, wherein the sentences in a cluster of the clusters have stance scores with respect to other sentences in the cluster that satisfy a stance criteria;

forming, with a similarity group generator, at least one similarity group of the sentences in each of a plurality of the clusters, wherein each similarity group in one of the clusters has the sentences in one of the clusters having similarity scores satisfying a similarity criteria, wherein a plurality of similarity groups are formed from the sentences in one of the clusters, and wherein the stance detector and the similarity group generator are implemented using machine learning algorithms;

selecting sentences from similarity groups in the clusters based on stance scores of the sentences in the similarity groups;

forming a hypothesis set of the selected sentences in the similarity groups; and determining the stance scores of sentences in the documents with the sentences in the hypothesis set to determine stances of the documents with respect to the sentences in the hypothesis set.

8. The system of claim 7, wherein the forming the hypothesis set further comprises:

for a candidate selected sentence of the selected sentences, adding the candidate selected sentence to the hypothesis set in response to the candidate selected sentence having a pro-con variance score greater than a pro-con variance score threshold and the candidate selected sentence is not similar to a selected sentence already included in the hypothesis set.

9. The system of claim 7, wherein the operations further comprise:

determining, for the clusters, a pro-con variance score with respect to each sentence $s_i$ in a cluster and at least one other sentence $s_j$ in the cluster as a difference of a pro stance score between $s_i$ and $s_j$ and a con stance between $s_i$ and $s_j$, wherein the forming the hypothesis set comprises only including sentences having a pro-con variance score exceeding a pro-con variance score threshold.

10. The system of claim 7, wherein the determining the stance scores of sentences in the documents with the sentences in the hypothesis set comprises:

for each document of the documents, determining an aggregate statistic of stance scores of each sentence in the document with respect to each sentence in the hypothesis set, wherein the aggregate statistic of the stance scores with respect to one sentence in the hypothesis set comprises a document stance score for the document with respect to the sentence in the hypothesis set.

11. A method for extracting hypotheses from documents for a stance measurement, comprising:

determining, with a stance detector, stance scores of sentences;

clustering the sentences from the documents into a plurality of clusters, wherein the sentences in a cluster of the clusters have stance scores with respect to other sentences in the cluster that satisfy a stance criteria;

forming, with a similarity group generator, at least one similarity group of the sentences in each of a plurality of the clusters, wherein each similarity group in one of the clusters has the sentences in one of the clusters having similarity scores satisfying a similarity criteria, wherein a plurality of similarity groups are formed from the sentences in one of the clusters, and wherein the stance detector and the similarity group generator are implemented using machine learning algorithms;

selecting sentences from similarity groups in the clusters based on stance scores of the sentences in the similarity groups;

forming a hypothesis set of the selected sentences in the similarity groups; and determining the stance scores of sentences in the documents with the sentences in the hypothesis set to determine stances of the documents with respect to the sentences in the hypothesis set.

12. The method of claim 11, wherein the forming the hypothesis set further comprises:

for a candidate selected sentence of the selected sentences, adding the candidate selected sentence to the hypothesis set in response to the candidate selected sentence having a pro-con variance score greater than a pro-con variance score threshold and the candidate selected sentence is not similar to a selected sentence already included in the hypothesis set.

13. The method of claim 11, wherein the stance criteria comprises a stance score threshold, such that a stance score exceeding the stance score threshold indicates one sentence in a cluster has a clear pro or con stance with respect to another sentence in the cluster, and wherein the similarity criteria comprises a similarity score threshold, such that a similarity score exceeding the similarity score threshold indicates sentences that are similar.

14. The method of claim 11, further comprising:

determining, for the clusters, a pro-con variance score with respect to each sentence $s_i$ in a cluster and at least one other sentence $s_j$ in the cluster as a difference of a pro stance score between $s_i$ and $s_j$ and a con stance between $s_i$ and $s_j$, wherein the forming the hypothesis set comprises only including sentences having a pro-con variance score exceeding a pro-con variance score threshold.

15. The method of claim 11, wherein each pair of sentences in one cluster having a stance score satisfying a stance criteria includes one sentence having a strong stance score with respect to another sentence in the cluster.

16. The method of claim 11, wherein the determining the stance scores of sentences in the documents with the sentences in the hypothesis set comprises:

for each document of the documents, determining an aggregate statistic of stance scores of each sentence in the document with respect to each sentence in the hypothesis set, wherein the aggregate statistic of the stance scores with respect to one sentence in the hypothesis set comprises a document stance score for the document with respect to the sentence in the hypothesis set.

17. The method of claim 11, wherein the clustering the sentences comprises:

for N documents $d_1$ . . . $d_N$, perform for document $d_i$:

determine stance scores for sentence $s_j$ of a plurality of sentences in $d_i$ and a sentence $s_k$ of a plurality of sentences in $d_i{}'$, for i=1 to N and i'=(i+1) mod N;

forming a graph of nodes representing sentences in the documents with edges between pairs of sentences $s_j$ in $d_i$ and $s_k$ in $d_{i'}$ having stance scores exceeding a stance score criteria, wherein the clusters are comprised of nodes interconnected by the edges in the graph.

* * * * *